United States Patent [19]

Schmidt et al.

[11] Patent Number: 5,194,573
[45] Date of Patent: Mar. 16, 1993

[54] DISCONTINUOUS PROCESS FOR POLYCONDENSATION OF TEREPHTHALIC ACID AND 1,4-BIS(HYDROXYMETHYL)CYCLOHEXANE

[75] Inventors: Wolfgang Schmidt, Rodenbach; Ulrich Thiele, Bruchkoebel, both of Fed. Rep. of Germany

[73] Assignee: Zimmer Aktiengesellschaft, Frankfurt, Fed. Rep. of Germany

[21] Appl. No.: 853,984

[22] Filed: Mar. 20, 1992

[30] Foreign Application Priority Data

Nov. 16, 1991 [DE] Fed. Rep. of Germany ....... 4137841

[51] Int. Cl.$^5$ ...................... C08G 63/78; C08G 63/02
[52] U.S. Cl. .................................... 528/279; 528/272
[58] Field of Search ............................. 528/272, 279

[56] References Cited

U.S. PATENT DOCUMENTS

| | | | |
|---|---|---|---|
| 4,155,889 | 5/1979 | Fagerburg et al. | 528/272 |
| 4,191,705 | 3/1980 | Lindner et al. | 528/272 |
| 4,297,455 | 10/1981 | Lindner et al. | 525/439 |
| 4,350,807 | 9/1982 | McConnell et al. | 528/302 |
| 4,379,912 | 4/1983 | Lu | 528/274 |
| 4,396,746 | 8/1983 | Toga | 525/444 |
| 4,446,303 | 5/1984 | Moore et al. | 528/308.2 |
| 4,481,352 | 11/1984 | McConnell et al. | 528/302 |
| 4,786,692 | 11/1988 | Allen et al. | 525/439 |
| 4,900,610 | 2/1990 | Hochberg et al. | 428/195 |

Primary Examiner—John Kight, III
Assistant Examiner—T. Mosley
Attorney, Agent, or Firm—Allegretti & Witcoff

[57] ABSTRACT

Process for discontinuous production of polyesters by esterification of terephthalic acid with a definite excess of 1,4-bis(hydroxymethyl)cyclohexane in the presence of a titanium catalyst at 180° to 300° C. and 0.8 to 1.5 bar up to a conversion of 98.0% to 99.6%, then precondensation with the addition of more titanium catalyst at 270° to 300° C. and 500 to 5 mbar up to a conversion of 99.5% to 99.9% and polycondensation at 295° to 310° C. and less than 1.5 mbar up to a conversion corresponding to 40% to 95% of the maximum possible viscosity.

10 Claims, No Drawings

DISCONTINUOUS PROCESS FOR POLYCONDENSATION OF TEREPHTHALIC ACID AND 1,4-BIS(HYDROXYMETHYL)CYCLOHEXANE

BACKGROUND OF THE INVENTION

This invention relates to a discontinuous process for preparing (1,4-cyclohexanedimethylene) terephthalate polymers starting from terephthalic acid.

(1,4-Cyclohexanedimethylene) terephthalate polymers and copolymers have long been known and are characterized by their high melting points (U.S. Pat. Nos. 2,901,466, 3,261,812, 4,042,570).

Although the use of terephthalic acid as a raw material is not ruled out, only examples starting with dialkyl terephthalates are given in the literature. The high temperature required to assure the melt phase during polycondensation lead to decomposition products, which also act as chain terminators and thus prevent the formation of high-molecular polymers (U.S. Pat. No. 3,271,370). In order to counteract this degradation, it has been proposed that diol and dialkyl terephthalate be used in approximately equimolar amounts (U.S. Pat. No. 3,271,370), and that zinc fluorotitanate be used as an especially active catalyst (U.S. Pat. No. 3,068,204), that the ester exchange step be performed under nitrogen (U.S. Pat. No. 4,042,570) or that a stabilizing comonomer such as gentisic acid derivatives be polymerized into the product (German Patent Application 1,495,570).

This tendency to form decomposition products which then function as chain terminators occurs to a significantly greater extent when terephthalic acid is used as a raw material, where the aforementioned countermeasures have proven to have little or no effect.

In attempting to apply the examples in the literature for dimethyl terephthalate to terephthalic acid, it has been found that after a polycondensation time of 40 to 60 minutes at 295° to 305° C. the degradation reaction greatly exceeds the condensation reaction and is accompanied by an exponential decline in the intrinsic viscosity plus discoloration of the polymer. After prolonged thermal stress, decomposition down the oligomer level has even been observed. The statement made in U.S. Pat. No. 3,271,370 that an excess of diol is a disadvantage has not been confirmed when using terephthalic acid.

These chain terminating substances are metabolites of 1,4-bis(hydroxymethyl)cyclohexane that are formed by dehydration of the free or esterified $CH_2OH$ groups attached to the cyclohexane ring, thus forming methylenecyclohexane and methylcyclohexene derivatives. This dehydration is catalyzed by acids in general and by terephthalic acid in particular and by the COOH end groups formed by cleavage of ester linkages during the polymerization process.

THE INVENTION

Thus, the object of the present invention is to provide a discontinuous process that will permit the production of stable, high-molecular (1,4-cyclohexanedimethylene) terephthalate polymers and copolymers by starting with terephthalic acid. Specifically, the problem includes minimizing the autocatalytic effect of the acid groups of terephthalic acid on the dehydration of the $CH_2OH$ groups attached to the cyclohexane ring.

With the process according to this invention, both homopolymers and copolymers can be produced. Terephthalic acid is of the quality conventionally used for polyesters. The 1,4-bis(hydroxymethyl)cyclohexane should have a cis/trans isomer ratio in the range of 20 to 40 cis isomers to 80 to 60 trans isomers, preferably 30 cis to 70 trans. Up to 20 mol % of the terephthalic acid can be replaced by other dicarboxylic acids such as isophthalic acid, cyclohexanedicarboxylic acid or adipic acid. Likewise, the 1,4-bis(hydroxymethyl)cyclohexane can be partially replaced by other alkanediols, e.g., ethylene glycol or 1,4-butanediol and/or by polyalkylene oxide diols such as diethylene glycol or low-molecular polybutylene oxide glycol. The sum of comonomers in the polyester should not exceed 20 mol %, based on polyester, however, because otherwise the reaction temperatures must be adjusted. Because of the great difference in volatility and reactivity of these diols in some cases, the amount of codiol in the starting monomer mixture may occasionally be much higher than in the resulting polyester. Codiols such as ethylene glycol and diethylene glycol have a much lower boiling point than 1,4-bis(hydroxymethyl)cyclohexane and are expelled preferentially with the reaction vapors, especially those of esterification step a). The amounts of comonomer needed for a certain content in the copolyester can be determined easily by preliminary experiments if those skilled in the art are not familiar with them.

The minimization of autocatalytic degradation reactions according to this invention is achieved only if the following measures are implemented in addition to the usual pressure ranges:
  total molar ratio of diol to diacid at least 1.2 to 1,
  split catalyst feed,
  narrow temperature ranges in the precondensing and polycondensing steps,
  limited, relatively short residence time in the precondensation and polycondensing steps,
  termination of melt phase polycondensation before reaching the maximum possible
  degree of polycondensation, measured as viscosity.

It thus was found necessary to use the 1,4-bis(hydroxymethyl)cyclohexane in a definite excess corresponding to a molar ratio of diol to diacid of 1.2-2.5 to 1, preferably 1.3-2.3 to 1. The diol and diacid can be placed in the reactor for the esterification step and then heated to the reaction temperature.

Preferably, however, diol is added to the terephthalic acid in a mixing container outside the reactor only in a sufficient amount to form a free-flowing paste at 55° to 80° C., which corresponds to a molar ratio of diol to diacid of 1.0-1.5 to 1, preferably 1.1-1.3 to 1, depending on the quality of the terephthalic acid. The amount of 1,4-bis(hydroxymethyl)cyclohexane still needed to achieve a total molar ratio of diol to diacid of 1.2-2.5 to 1, preferably 1.3-2.3 to 1, is placed in the reactor for the esterification step and liquefied by supplying heat. The paste is then fed into this 1,4-bis(hydroxymethyl)cyclohexane heated to 50° to 80° C. or preferably to 240° to 260° C. It is also possible to introduce the paste and liquefied diol simultaneously into the reactor through separate lines.

Of the various titanium and tin catalysts tested, the organic titanium compounds such as titanium tetraisopropylate and titanium tetra-n-butanoate have proven to be especially suitable in the sense of this invention. A phosphorus compound may also be added.

Of the total amount of catalyst, only a portion corresponding to 10 to 300 ppm Ti, preferably 30 to 200 ppm Ti, is introduced into esterification step in the form of a solution in a small amount of diol or as a component of the terephthalic acid-diol paste. Additional catalyst dissolved in a small amount of diol and corresponding to 10 to 300 ppm Ti, preferably 30 to 200 ppm Ti, is added to the esterification mixture at the start of precondensation step. The total amount is preferably 40 to 400 ppm Ti, especially 150 to 400 ppm Ti.

Although the reaction pressures (p), namely $p_a$ = 0.8–1.5 bar, preferably 0.9–1.2 bar, (during esterification)

$p_b$ = 500–5 mbar, preferably 200–30 mbar, (during precondensation)

$p_c$ < 1.5 mbar, preferably 0.1–0.8 mbar, (during polycondensation)

are within the conventional ranges for polyalkylene terephthalates, the temperature program is critical. Deviations from the stipulated temperature ranges $t_a$ = 180°–300° C., preferably 210°–295° C., (during esterification)

$t_b$ = 270°–300° C., preferably 285°–295° C., (during precondensation)

$t_c$ = 295°–310° C., preferably 295°–305° C., (during polycondensation)

where $t_c \geq t_b$ toward higher temperatures lead directly to increased decomposition of product, whereas deviations toward lower temperatures lead to longer residence times and therefore indirectly lead to increased decomposition. Local temperature fluctuations, so-called hot spots must be avoided and in particular the temperature $t_c$ of the polycondensation step must not differ from the stipulated average temperature by more than 5° C. at any point. It is self-evident that if the pressure is kept constant as in the esterification step, the reaction temperature will automatically increase as the condensation reaction progresses.

Surprisingly, the extent of the degradation reactions is also determined by the residence time in the esterification and precondensation steps and the respective degree of polycondensation. The best results are obtained when the esterification step is continued to a relatively high conversion of 98.0 to 99.6%, and the residence time in the subsequent precondensation step is relatively short, corresponding to a conversion of 99.5 to 99.9%. This conversion is achieved in esterification step when the amount of vapor distilled off per unit of time approaches zero. For the precondensing step, a residence time of 20 to 70 minutes, preferably 30 to 60 minutes, is stipulated.

It is even more important to terminate the polycondensation reaction in the melt phase before the maximum degree of polycondensation is reached, particularly at 40% to 95% of the maximum possible viscosity, and preferably at 70% to 95%. This corresponds to a residence time of 20 to 80 minutes, preferably 30 to 60 minutes, in the polycondensation reactor, including the time until the product enters the granulator connected downstream.

The degree of polycondensation can be determined by measuring the viscosity of the reaction mixture, e.g., by torque or capillary viscosimeter.

The degree of polycondensation depends on factors such as the reaction temperatures and pressures, the nature and the quantity of catalysts, the performance of the equipment and the presence of comonomers. Under given conditions, there is a maximum polycondensation threshold beyond which the viscosity can no longer be increased because the degradation reactions exceed the polycondensation reactions.

The changes in viscosity as a function of the residence time in the polycondensation step yields a relatively narrow bell-shaped curve with a short induction phase. The viscosity maximum can be determined by preliminary experiments under the same conditions.

Degradation reactions occur essentially from the very start of polycondensation. As described initially, the degradation products inhibit molecular build-up and catalyze degradation, so the polycondensation reactions decrease continuously while the degradation reactions increase, and these competing reactions are also manifested in subsequent processing from the melt. Therefore, an adequate thermal stability of the polyester can be assured only if polycondensation is terminated before any mentionable quantities of degradation products have formed, measured as double bonds that can be titrated with bromine and as free COOH groups, i.e., before reaching the maximum viscosity.

The process according to this invention leads to a relatively high-molecular polyester with an intrinsic viscosity of at least 0.60 dL/g that is fully adequate for most applications such as engineering plastics, especially compounds with other polymers and/or fillers. A further increase in intrinsic viscosity can be achieved by solid-phase polycondensation for 4 to 8 hours at a constant or variable temperature in the range of 210° to 280° C. However, a significant increase in viscosity by solid-phase polycondensation is possible only if melt polycondensation is terminated before reaching the maximum possible viscosity that can be achieved in the melt phase.

The polymer obtained by the process according to this invention contains less than 200 meq double bonds that can be titrated with bromine per kg polyester, preferably less than 100 meq/kg, and less than 40 meq free COOH groups per kg polyester, preferably less than 30 meq/kg.

The individual process steps can be carried out in one and the same reactor or in several reactors connected in series. Preferably, the esterification and precondensation steps are carried out in a first reactor and the polycondensation step in a second reactor.

SPECIFIC EXAMPLES

The following examples are presented to support the invention without restricting it. The properties of the polyester were determined by the following methods:

Intrinsic viscosity (I.V.)

Approximately 125 mg polyester are dissolved in 25 mL of a mixture of phenol and 1,2-dichlorobenzene (3:2) and the viscosity of this solution is determined at 25° C. according to Ubbelohde. The intrinsic viscosity is calculated according to Billmeyer from the resulting relative viscosity.

Double bonds that can be titrated with bromine (C=C)

The polyester is reacted with methanol under pressure, the insoluble residue is separated and the C=C bond content in the solution is determined by known methods with bromine in meq/kg, and a blank value determination must be performed.

Free COOH groups

The polyester is dissolved in a mixture of o-cresol and chloroform (70:30 parts by weight) while heating and the COOH group content is determined by photometry with 0.05N ethanolic potassium hydroxide solution against bromothymol blue.

The 1,4-bis(hydroxymethyl)cyclohexane (CHDM) used in the following examples had a cis/trans ratio of 30:70.

EXAMPLE 1

1458 parts by weight 1,4-bis(hydroxymethyl)cyclohexane (CHDM) and 1200 parts by weight terephthalic acid (TPA) (molar ratio 1.4:1) together with 40 ppm Ti, based on the diacid, in the form of titanium tetra-n-butanoate were placed in a high-grade steel reactor and heated and the stirrer was started. Above 228° C. a distillate is obtained. The decline in the amount of distillate indicates the end of esterification, corresponding to a conversion of 99.6%.

At 280° C., 120 ppm more Ti in the form of titanium tetra-n-butanoate dissolved in a small amount of CHDM were added. Then the temperature was raised to 300° C. and at the same time the pressure was lowered to 10 mbar and these conditions were maintained for 30 minutes. After lowering the pressure further to less than 0.8 mbar, polycondensation began and was continued until the viscosity of the reaction mixture, recorded continuously by means of a viscosimeter, after a period of increase began to decrease. This viscosity corresponds to the maximum possible viscosity.

The experiment was repeated, but now the polycondensation was terminated at 80% of the ascertained maximum possible viscosity. The resulting polyester had the following characteristics:

| Intrinsic viscosity (I.V.): | 0.715 dL/g |
|---|---|
| Bromine-titratable double bonds (C=C): | 73 meq/kg |
| Free COOH groups (COOH): | 21 meq/kg |

EXAMPLE 2 (COMPARISON)

Example 1 was repeated, but CHDM and TPA were used in a molar ratio of 1.2:1 and polycondensation was carried out at a lower temperature of 291° C. Polycondensation was terminated at 90% of the maximum possible viscosity, as determined in Example 1.

The resulting polyester had the following characteristics:

| I.V. | 0.642 dL/g |
|---|---|
| C=C | 210 meq/kg |
| COOH | 31 meq/kg |

EXAMPLE 3

2082 parts by weight CHDM and 1200 parts by weight TPA (molar ratio 2.0:1) were reacted together with 234 ppm Ti as titanium tetra-n-butanoate. Esterification began at 215° C. and was finished at 280° C. Then 164 ppm more Ti in the form of Ti(OBu)4 were added, and the pressure was lowered to 300 mbar, and these conditions were maintained for 20 minutes. Polycondensation was performed at less than 0.8 mbar up to 80% of the maximum possible viscosity, as determined in Example 1. The resulting polyester had the following characteristics:

| I.V. | 0.675 dL/g |
|---|---|
| C=C | 95 meq/kg |
| COOH | 6.1 meq/kg |

EXAMPLE 4

1354 parts by weight CHDM and 1200 parts by weight TPA (molar ratio 1.3:1) were reacted together with 200 ppm Ti as Ti(OBu)4. Esterification began at 218° C. and was continued up to a conversion of 99.4%, corresponding to 275° C. Then after adding 40 ppm more Ti in the form of Ti(OBu)4 the temperature was raised to 280° C. while at the same time the pressure was lowered to 200 mbar, and these conditions were maintained for 30 minutes. Thereafter, the pressure was lowered to 50 mbar at 290° C. and again kept there for 30 minutes. The subsequent polycondensation was carried out at 300° C. and less than 0.8 mbar until achieving 95% of the maximum possible viscosity, as determined in Example 1. The resulting polyester had the following characteristics:

| I.V. | 0.667 dL/g |
|---|---|
| C=C | 124 meq/kg |
| COOH | 22 meq/kg |

EXAMPLE 5 (COMPARISON)

Example 4 was repeated, but only 10 ppm Ti in the form of Ti(OBu)4 were used. Esterification was not begun until the temperature reached 231° C. and was stopped at a conversion of 99.2%. Polycondensation was continued until reaching the maximum viscosity. The resulting polyester had the following characteristics:

| I.V. | 0.556 dL/g |
|---|---|
| C=C | 204 meq/kg |
| COOH | 46 meq/kg |

EXAMPLE 6 (COMPARISON)

Example 4 was repeated, but 20 ppm Ti in the form of potassium hexafluorotitanate were used as the catalyst. Esterification did not begin until the temperature reached 235° C. and was finished at a conversion of 99.2%. Polycondensation was continued to the maximum viscosity. The resulting polyester had the following characteristics:

| I.V. | 0.540 dL/g |
|---|---|
| C=C | 225 meq/kg |
| COOH | 50 meq/kg |

EXAMPLE 7 (COMPARISON)

Example 4 was repeated, but 150 ppm Sn in the form of monobutyltin oxide hydrate were used as the catalyst. The esterification began at 206° C. and was finished at a conversion of 99.4%. Polycondensation was terminated at 80% of the maximum possible viscosity, as determined in Example 1. The resulting polyester had the following characteristics:

| I.V. | 0.514 dL/g |
|---|---|
| C=C | 220 meq/kg |
| COOH | 43 meq/kg |

EXAMPLE 8 (COMPARISON)

1146 parts by weight CHDM and 1200 parts by weight TPA (molar ratio 1.1:1) were reacted together with 200 ppm Ti as Ti(OBu)$_4$. Esterification began at 211° C. and was stopped at 280° C., corresponding to a conversion of 94.2%. Then precondensation was performed at 290° C. and 100 mbar for 30 minutes. The subsequent polycondensation at 300° C. and less than 0.8 mbar was continued up to 95% of the maximum possible viscosity, as determined in Example 1. The resulting polyester had the following characteristics:

| I.V. | 0.495 dL/g |
|---|---|
| C=C | 223 meq/kg |
| COOH | 53 meq/kg |

EXAMPLE 9 (COMPARISON)

1354 parts by weight CHDM and 1200 parts by weight TPA (molar ratio 1.3:1) were reacted together with 59 ppm Ti as Ti(OBu)$_4$ at 1200 mbar. Esterification began at 221° C. and was stopped at a conversion of 99.4%. The temperature in precondensation was raised to 290° C. and the pressure was lowered in two steps, first to 200 mbar and then to 50 mbar, and the reaction mixture was kept at these pressures for 30 minutes each. Polycondensation was performed at 300° C. and less than 0.8 mbar up to 90% of the maximum possible viscosity, as determined in Example 1. The resulting polyester had the following characteristics:

| I.V. | 0.572 dL/g |
|---|---|
| C=C | 185 meq/kg |
| COOH | 41 meq/kg |

EXAMPLE 10

130 parts by weight CHDM and 100 parts by weight TPA (molar ratio 1.5:1) were stirred with 40 ppm Ti in the form of titanium tetraisopropylate to yield a paste at 80° C., which was then added gradually to 70 parts by weight CHDM heated to 245° C. (molar ratio total diol/diacid 2.3:1) while continuing to heat. Esterification was continued for 30 minutes after addition of the paste was finished until a temperature of 290° C. had been reached. Then 120 ppm Ti in the form of titanium tetraisopropylate dissolved in a small amount of CHDM were added, the temperature was raised to 295° C. and the pressure was lowered to 50 mbar, and these conditions were maintained for 30 minutes. Polycondensation was performed at 300° C. and a pressure of less than 0.8 mbar up to 90% of the maximum possible viscosity as determined in Example 1.

The resulting polyester had the following characteristics:

| I.V. | 0.80 dL/g |
|---|---|
| C=C | 65 meq/kg |
| COOH | 15 meq/kg |

EXAMPLE 11

1093 parts by weight CHDM were esterified with 345 parts by weight diethylene glycol and 1200 parts by weight TPA (molar ratio of total diol to diacid 1.5:1) in the presence of 60 ppm Ti as Ti(OBu)$_4$ with an increase in temperature from 200° C. to 275° C. Then 30 ppm Ti in the form of Ti(OBu)$_4$ were added. The temperature in precondensation was raised to 290° C. and the pressure was lowered first to 200 mbar and then to 50 mbar and kept at each pressure level for 30 minutes. After further lowering the pressure to less than 0.8 mbar, polycondensation was performed at 296° C. up to 85% of the maximum possible viscosity, as determined in Example 1. The resulting polyester had the following characteristics:

| I.V. | 0.713 dL/g |
|---|---|
| C=C | 97 meq/kg |
| COOH | 25 meq/kg |

EXAMPLE 12

1354 parts by weight CHDM were esterified in the presence of 59 ppm Ti as Ti(OBu)$_4$ with 1128 parts by weight TPA and 72 parts by weight isophthalic acid (molar ratio diol/total acid 1.3:1) at temperatures increasing up to 275° C. until reaching a conversion of 99.3%. Then 30 ppm Ti in the form of Ti(OBu)$_4$ were added.

In precondensation the temperature was raised to 290° C., and the pressure was lowered first to 200 mbar and then to 50 mbar and kept at each level for 30 minutes. Polycondensation was performed at 300° C. and pressures of less than 0.8 mbar up to 75% of the maximum possible viscosity, as determined in Example 1. The resulting polyester had the following characteristics:

| I.V. | 0.623 dL/g |
|---|---|
| C=C | 112 meq/kg |
| COOH | 29 meq/kg |

EXAMPLE 13

1250 parts by weight CHDM were esterified with 1200 parts by weight TPA (molar ratio 1.2:1) in the presence of 40 ppm Ti in the form of Ti(OBu)$_4$ up to a conversion of 99.1%. After adding 120 ppm more Ti in the form of Ti(OBu)$_4$, the product was precondensed at 290° C. and 100 mbar for 30 minutes and then polycondensed at 300° C. and less than 0.8 mbar up to 95% of the maximum possible viscosity, as determined in Example 1. The resulting polyester had the following characteristic values:

| I.V. | 0.650 dL/g |
|---|---|
| C=C | 164 meq/kg |
| COOH | 29 meq/kg |

This polyester was then subjected to solid-phase polycondensation at 240° C. in a stream of nitrogen for 7 hours. The post-condensed polyester had the following characteristics:

| I.V. | 0.774 dL/g |
|---|---|
| C=C | 169 meq/kg |
| COOH | 17 meq/kg |

EXAMPLE 14

The polyester from Example 1 was subjected to solid-phase polycondensation at 240° C. in a stream of nitrogen for 7 hours. The post-condensed polyester had the following characteristics:

| I.V. | 0.907 dL/g |
|---|---|
| C=C | 104 meq/kg |
| COOH | 6.5 meq/kg |

EXAMPLE 15

1354 parts by weight CHDM were esterified with 1200 parts by weight TPA (molar ratio 1.3:1) in the presence of 100 ppm Ti as $Ti(OBu)_4$ up to a conversion of 99.4%. In precondensation, the pressure was lowered to 200 mbar for 30 minutes after adding 50 ppm more Ti in the form of $Ti(OBu)_4$ and the temperature was raised to 280° C. and then the pressure was lowered to 50 mbar for 30 minutes more. The subsequent polycondensation at 300° C. and less than 0.8 mbar was terminated at 45% of the maximum possible viscosity, as determined in Example 1.

The resulting polyester had the following characteristics:

| I.V. | 0.412 dL/g |
|---|---|
| C=C | 45 meq/kg |
| COOH | 12 meq/kg |

This polyester was subjected to solid-phase polycondensation for 7 hours at 260° C. in a stream of nitrogen. The post-condensed polyester had the following characteristics:

| I.V. | 0.842 dL/g |
|---|---|
| C=C | 93 meq/kg |
| COOH | 7 meq/kg |

We claim:

1. Discontinuous process for producing polyesters with at least 80 mol % (1,4-cyclohexanedimethylene) terephthalate units, an intrinsic viscosity of at least 0.60 dL/g, less than 200 meq/kg bromine-titratable double bonds and less than 40 meq/kg free COOH groups, comprising:

a) esterifying terephthalic acid (diacid) and 1,4-bis(-hydroxymethyl)cyclohexane (diol) in a molar ratio of diol to diacid based on the diacid, of 1.2–2.5:1 in the presence of 10–300 ppm Ti as an organic titanium compound, at an increasing temperature $t_a$ between 180°–300° C. and a pressure $p_a$ of 0.8–1.5 bar, to achieve a conversion of 98.0 to 99.6%, b) precondensing the mixture of step a) by adding 10–300 ppm more Ti, based on the diacid, in the form of an organic titanium compound, raising the temperature to a value $t_b$ between 270° and 300° C. and lowering the pressure to a value $p_b$ between 500 and 5 mbar, during a residence time of 20 to 70 minutes, to achieve a conversion of 99.5 to 99.9%, and c) polycondensing the product of step b) at a temperature of $t_c \geq t_b$ in the range of 295°–310° C. in the absence of local temperature fluctuations of more than 5° C., and at a pressure $p_c$ of less than 1.5 mbar for a residence time sufficient to achieve a conversion corresponding to 40–95% of the maximum possible viscosity.

2. The process of claim 1 wherein
in step a) said molar ratio is 1.3 to 2.3:1, the amount of Ti is 30–200 ppm, the temperature $t_a$ is in the range of 210° to 295° C. and the pressure $p_a$ is in the range of 0.9 to 1.2 bar,
in step b) the amount of Ti is 30 to 200 ppm, the temperature $t_b$ is in the range of 285°–295° C., the pressure is in the range of 200–30 mbar and the residence time is in the range of 30–60 minutes,
in step c) the temperature $t_c$ is in the range of 295°–305° C. and the pressure $p_c$ is in the range of 0.1–0.8 mbar, and
the total Ti added in steps a) and b) is 40–400 ppm.

3. The process of claim 1 in which in step a) the molar ratio of said diol to said diacid initially is 1.0–1.5:1, the mixture consists of a free flowing paste at a temperature of 55°–80° C.,and additional liquified diol is added to bring the total molar ratio to 1.2–2.5:1.

4. The process of claim 1 wherein in step a) a portion of said terephthalic acid is replaced by isophthalic acid.

5. The process of claim 1 wherein in step a) up to 20 mol % of said terephthalic acid is replaced by a diacid taken from the group consisting of isophthalic acid, cyclohexanedicarboxylic acid and adipic acid.

6. The process of claim 1 wherein in step a) up to 20 mol % based on the polyester of said 1,4-bis(hydroxymethyl)cyclohexane is replaced by a diol taken from the group consisting of ethylene glycol, 1,4-butanediol, diethyleneglycol and polybutylene oxide glycol of low molecular weight.

7. The process of claim 3 wherein in step a) said paste is added to said diol which has been heated to a temperature of 240°–260° C.

8. The process of claim 3 wherein the molar ratio of diol to diacid in said paste is 1.1–1.3:1 and in the total molar ratio is 1.3–2.3:1.

9. The process of claim 1 wherein in step c) said conversion corresponds to 70–95% of the maximum possible viscosity.

10. The process of claim 1 wherein the product of step c) is granulated and the granulated product is subjected to solid phase polycondensation for 4–8 hours at a temperature in the range of 210°–280° C.

* * * * *